US009279467B2

(12) United States Patent
Hanna et al.

(10) Patent No.: US 9,279,467 B2
(45) Date of Patent: Mar. 8, 2016

(54) BRAKE ROTORS HAVING A CUSTOM DESIGNER FEATURE AND METHODS FOR FORMING THE SAME (75) Inventors: Michael D. Hanna, West Bloomfield, MI (US); James A. Webster, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1051 days.

(21) Appl. No.: 13/304,896

(22) Filed: Nov. 28, 2011

(65) Prior Publication Data

US 2013/0133995 A1 May 30, 2013

(51) Int. Cl.
*C23C 8/04* (2006.01)
*C23C 8/00* (2006.01)
*F16D 65/12* (2006.01)
F16D 69/00 (2006.01)

(52) U.S. Cl.
CPC .......... *F16D 65/12* (2013.01); *F16D 2069/002* (2013.01)

(58) Field of Classification Search
CPC .............. C23C 8/04; C23C 8/00; C23C 8/02; C23C 8/20; C23C 8/10; C23C 8/24; C23C 8/48; C23C 8/44; F16D 65/12; F16D 2069/002
USPC ...................... 148/212, 218, 280; 188/218 XL
See application file for complete search history.

(56) References Cited

U.S. PATENT DOCUMENTS 3,546,088 A * 12/1970 Jones et al. ............... 204/224 M
6,457,566 B1 * 10/2002 Toby ....................... 188/1.11 W

FOREIGN PATENT DOCUMENTS

CN 1232090 A 10/1999
CN 101603456 A 12/2009

OTHER PUBLICATIONS anodize. (n. d.). Dictionary.com Unabridged. Retrieved Dec. 9, 2014, from Dictionary.com website: http://dictionary.reference.com/browse/anodize.*
Burleigh, T. D., et al. "Anodizing steel in KOH and NaOH solutions." Journal of the Electrochemical Society 154.10 (2007): C579-C586.*
Vanek, Derek. "An update on brush plating." Metal Finishing 100.7 (2002): 18-20.*
Chinese Office Action dated Jul. 1, 2014; Application No. 201210493581.8; Applicant: GM Global Technology Operations LLC; 10 pages.

* cited by examiner

*Primary Examiner* — Jessee Roe
(74) *Attorney, Agent, or Firm* — BrooksGroup

(57) ABSTRACT

A method is disclosed for forming a brake rotor including a desired custom marking having a predetermined size and shape. The method includes applying a chemical treatment to a marking portion of a surface of the rotor. The marking portion has a size and shape corresponding to the predetermined size and shape of the desired custom marking. The chemical treatment is configured to affect, in a predetermined manner, an ability of a stimulus, to which the rotor is to be exposed, to alter properties of the rotor. The method also includes exposing the rotor, having the chemical treatment applied thereto, to the stimulus. The stimulus alters properties of the rotor at the marking portion differently than the stimulus alters properties of the rotor at other portions of the rotor adjacent the marking portion, thereby forming physical differences in the rotor, which, being visually perceptible, form the custom marking.

15 Claims, 6 Drawing Sheets

BRAKE ROTORS HAVING A CUSTOM DESIGNER FEATURE AND METHODS FOR FORMING THE SAME

TECHNICAL FIELD

The present disclosure relates generally to forming a custom designer feature on a manufactured component and, more particularly, to forming a custom visible designer feature on a vehicle brake rotor.

BACKGROUND

Many manufactured components, such as casted brake rotors, are usually unmarked due to difficulties of marking. For components that will experience wear during use, effective marking is challenging or impossible to maintain. Regarding brake rotors, for example, a marking including print, a label, or etching on a frictional surface will quickly wear in response to a few applications of the breaks.

There is a need for a way to effectively and lastingly mark components without adding prohibitive cost to the manufacturing process or compromising component quality. For brake rotors, negative effects on quality could include an unwanted increase in weight, a decrease in strength, or a decrease in frictional properties.

SUMMARY

In one aspect, the present disclosure relates to a method for forming a brake rotor including a desired custom marking having a predetermined size and a predetermined shape. The method includes applying a chemical treatment to a marking portion of a surface of the brake rotor. The marking portion to which the chemical treatment is applied has a size and a shape corresponding to the predetermined size and the predetermined shape of the desired custom marking. The chemical treatment is configured to affect, in a predetermined manner, an ability of a stimulus, to which the brake rotor is to be exposed, to alter properties of the brake rotor. The method also includes exposing the brake rotor, having the chemical treatment applied thereto, to the stimulus configured to alter properties of the brake rotor. The stimulus alters properties of the brake rotor at the marking portion differently than the stimulus alters properties of the brake rotor at other portions of the brake rotor adjacent the marking portion, thereby forming physical differences in the brake rotor. The physical differences in the brake rotor, being visually perceptible, form the custom marking.

In another aspect, the present disclosure relates to a method, for forming a brake rotor including a desired custom marking having a predetermined size and a predetermined shape. The method includes applying a mechanical treatment to a marking portion of a surface of the brake rotor. The marking portion to which the mechanical treatment is applied has a size and a shape corresponding to the predetermined size and the predetermined shape of the desired custom marking. The mechanical treatment is configured to affect, in a predetermined manner, an ability of a stimulus, to which the brake rotor is to be exposed, to alter properties of the brake rotor. The method further includes exposing the brake rotor, having the mechanical treatment applied thereto, to the stimulus configured to alter properties of the brake rotor. The stimulus alters properties of the brake rotor at the marking portion differently than the stimulus alters properties of the brake rotor at other portions of the brake rotor adjacent the marking portion, thereby forming physical differences in the brake rotor. The physical differences in the brake rotor, being visually perceptible, form the custom marking.

In yet another aspect, the present disclosure further relates to a vehicle brake rotor having a desired custom marking having a predetermined size and a predetermined shape. The vehicle brake rotor is formed by a process including applying a treatment to a marking portion of a surface of the brake rotor. The treatment is selected from a group of treatments selected from a chemical treatment and a mechanical treatment, and the marking portion to which the treatment is applied has a size and a shape corresponding to the predetermined size and the predetermined shape of the desired custom marking. Also, the treatment is configured to affect, in a predetermined manner, an ability of a stimulus, to which the brake rotor is to be exposed, to alter properties of the brake rotor. The rotor-forming process also includes exposing the brake rotor, having the treatment applied thereto, to the stimulus configured to alter properties of the brake rotor, wherein the stimulus alters properties of the brake rotor at the marking portion differently than the stimulus alters properties of the brake rotor at other portions of the brake rotor adjacent the marking portion, thereby forming physical differences in the brake rotor. The physical differences in the brake rotor, being visually perceptible, form the custom marking.

Other aspects of the present invention will be in part apparent and in part pointed out hereinafter.

DETAILED DESCRIPTION

As required, detailed embodiments of the present disclosure are disclosed herein. The disclosed embodiments are merely examples that may be embodied in various and alternative forms, and combinations thereof. As used herein, for example, "exemplary," and similar terms, refer expansively to embodiments that serve as an illustration, specimen, model or pattern.

The figures are not necessarily to scale and some elements may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to employ the present disclosure.

Overview of the Disclosure

In various embodiments, the present disclosure describes a method for preparing a manufactured component to have a unique designer feature or contrast due to distinctions in chemical composition achieved by selective use of chemical or mechanical masking techniques. In an exemplary scenario, a brake rotor, such as a vehicle disc brake rotor, is first treated, at a pre-determined stage of manufacturing the rotor, with a chemical mask or a mechanical mask at a select position on a surface of the rotor. The chemical or mechanical mask may be referred to in a variety of ways, such as a material, matter, a material mask, a blocking mask, a diffusion-preventing mask/material/matter, or a diffusion-prevention mask, material, or matter.

In subsequent stages the rotor is altered, such as by being chemically or thermochemically treated. An exemplary treatment is a ferritic nitrocarburizing (FNC) process, which is described further below.

The chemical or mechanical mask blocks or changes an affect that the alteration (e.g., chemical alteration) would otherwise have on the rotor at the select position, thereby forming the custom designer feature. The chemical or mechanical mask in some embodiments includes a compound selected or formed to prevent completely (i.e., block), or prevent to some degree short of complete blocking, diffusion of elements or materials into the subject component—e.g., an automobile brake rotor. The element or material would be diffused into the component normally otherwise, without being prevented, at portions of the subject component that do not have the mask applied to it.

In the ferritic nitrocarburizing (FNC) process, nitrogen and carbon are diffused into the component—e.g., into a surface portion, including the surface and beyond the surface to a certain depth into the component). Regarding prevention of diffusion in connection with the FNC process, the chemical or mechanical mask is thus configured and applied to the subject component to prevent nitrogen and carbon diffusion into the component at the positions covered by the chemical or mechanical mask. The FNC process is described more below in connection with action block 406 of the method 400 of FIG. 4.

Additional stages of manufacture may be performed to complete the subject component—e.g., a vehicle brake rotor. In contemplated embodiments, additional stages include acts performed to emphasize or secure (e.g., seal) the resulting custom designer feature.

In some embodiments, the select position on which the custom designer feature is formed is a frictional surface of the brake rotor. The feature may be formed at the frictional surface shown in the figures or, alternatively or in addition, on a frictional surface (not shown in detail) that is opposite to the illustrated surface. In the context of an automobile, opposing surfaces can be referred to as an inboard surface—i.e., a surface of the rotor facing an inboard direction of the vehicle when the rotor is mounted on the vehicle for operation, and an outboard surface.

In some embodiments, a select position on which the custom designer feature is formed is a surface of a hub or hat portion of the brake rotor, whereat the rotor connects to a wheel and a vehicle on which the rotor is used. For instance, the custom designer feature can be provided adjacent bolt holes of the hat portion.

The custom designer features have various functions. As one, the custom designer features act to describe the component. For instance, the custom designer feature could indicate a source or type of the marked component. The marking can be made for identification—e.g., identifying the part in connection with inventorying, distribution, and/or selling, for branding, or for aesthetic purposes. As a particular example identification purpose, the custom designer feature can operate as a distinguishing feature visible during operation of the vehicle—i.e., while the rotor is in its operating position on the vehicle.

Numerous performance and cost benefits can result from manufacturing and use of components such as automotive brake rotors according to the present technology. Potential benefits include reducing mass and weight, improving NVH (noise, vibration, and harshness), acoustic reflection, energy absorption wear, and/or friction properties.

Component Types

Although the present disclosure describes the present technology primarily in connection with automotive brake rotors, the technology can be applied equally to other manufactured components. Other example components include automotive body components, casted or molded components of other vehicles, and components of non-vehicle products. The present disclosure is thus considered to cover application of the technology to components beyond brake rotors, and the descriptions herein regarding rotors are applicable equally to any other component.

Figure 1:
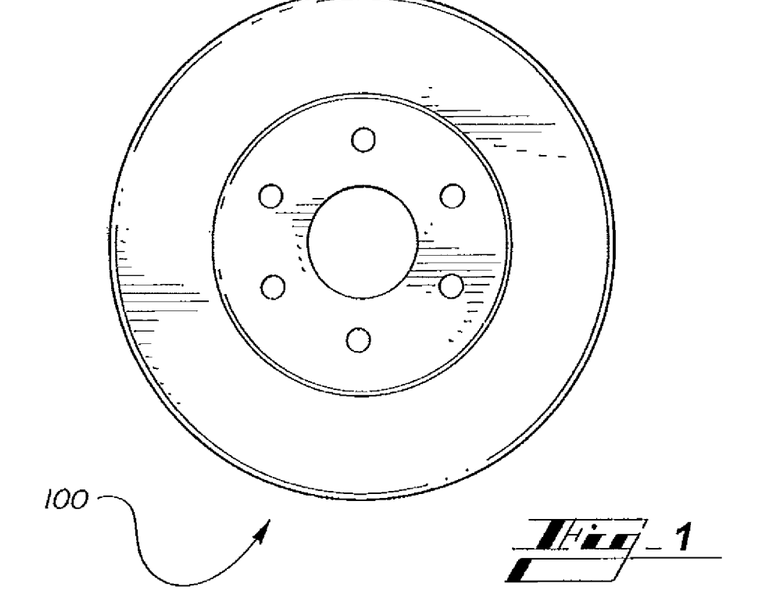
FIG. 1 illustrates a plan view of a conventional brake rotor.
Figure 2:
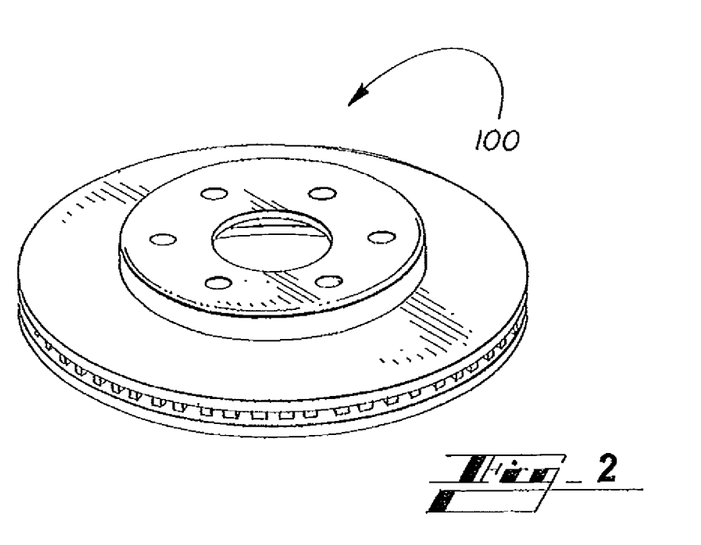
FIG. 2 illustrates a perspective view of the rotor of FIG. 1.

Now turning to the figures, and more particularly to the first figure, FIG. 1 shows a plan view of a conventional automobile brake rotor 100. FIG. 2 shows a perspective view of the same.

Exemplary Subject Component

Figure 3:
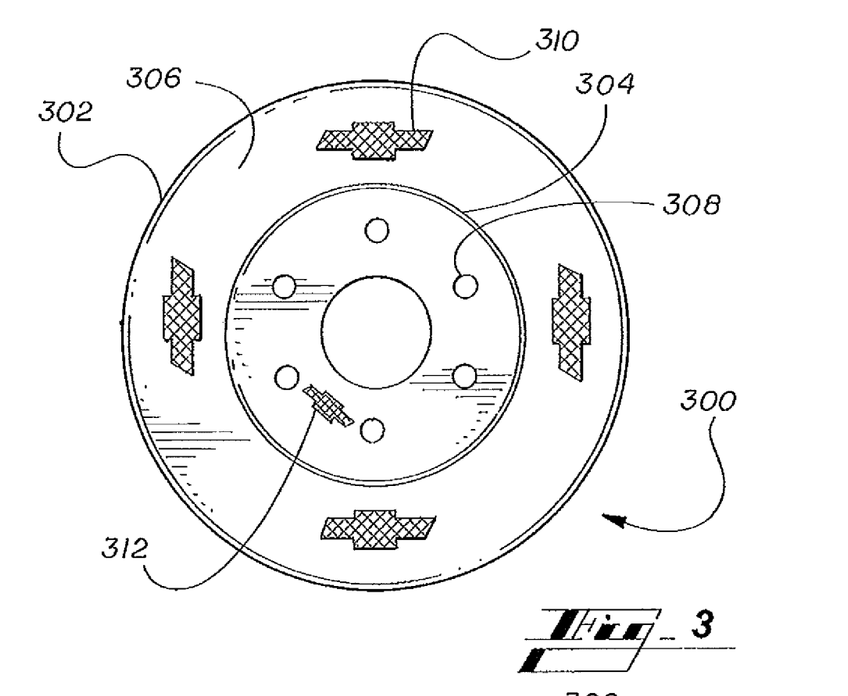
FIG. 3 illustrates a plan view of a rotor having a chemical treatment mask applied thereto, according to embodiments of the present disclosure.

FIGS. 3 and 5-7 show views of a brake rotor, at various stages of manufacture, according to the technology of the present disclosure. As indicated in FIG. 3, the rotor 300 includes a frictional portion 302 and a mounting or hat portion 304. Although the frictional portion 302 may include other materials without departing from the scope of the present disclosure, in one embodiment the frictional portion 302 includes steel, titanium, cast iron, an iron alloy, or a combination of any of these.

The hat portion 304 can include the same or different material(s) present in the friction portion 302. Although the hat portion 304 may include other materials without departing from the scope of the present disclosure, in one embodiment the hat portion 304 includes an alloy, such as an aluminum alloy—e.g., Al—Fe or an Al 356 casting alloy with a high silicon content.

The frictional portion 302 includes a frictional surface 306. When installed on a vehicle for operation, the frictional surface 306 is positioned adjacent brake pads (not shown). In operation, when a brake is applied by a driver of the vehicle, the brake pads contact the frictional surface 306 while the rotor 300 is rotating, causing the rotor and thus the vehicle to slow down. For this purpose, the rotor 300 must be highly robust and the frictional surface 306 must be able to withstand heavy intermittent frictional forces over the useful life of the rotor.

As known in the art, the frictional surface 304 may be formed to include voids (not shown) such as indentations and/or holes. The voids can have any of various sizes and styles, such as slots or dimples, for affecting operational properties of the rotor as desired. The technology described herein can be used with rotors having one or more such voids in its frictional surface. Such voids can be on micro-scale level.

The hat portion 304 includes holes 308 for receiving bolts that will connect the rotor 300 to the wheel and vehicle body—i.e., an axle hub (not shown). Although the present technology is described primarily in connection with forming custom designer features on the frictional surface 306 of the rotor 300, the technology can also be used to form one or more custom designer features on the hat portion 304. The descriptions provided herein regarding forming custom designer features on the frictional surface 306 should thus be considered to describe at least generally the manner by which custom designer features can be similarly formed on the hat portion 304.

Mask Formation

Figure 4:
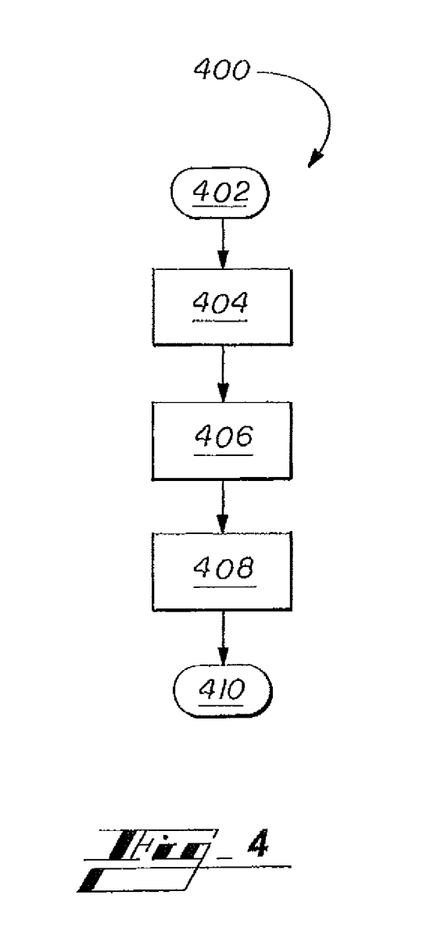
FIG. 4 illustrates a method for forming a completed rotor, shown in FIGS. 6 and 7, using the chemical treatment mask.

FIG. 4 shows schematically acts of a method 400 for forming a custom designer feature on a component, using a chemical mask, according to the present technology. It should be understood that the acts of the method 400 are not necessarily presented in any particular order and that performance of some or all the acts in an alternative order is possible and is contemplated. The acts have been presented in the demonstrated order for ease of description and illustration. Acts can be added, omitted and/or performed simultaneously without departing from the scope of the appended claims. It should also be understood that the illustrated method 400 can be ended at any time.

The method 400 of FIG. 4 will be described in conjunction with the rotor shown in FIGS. 3 and 5-7. As provided above, though the disclosure describes the present technology primarily in connection with automobile brake rotors, the technology can be applied equally to other manufactured components. The present method 400 should thus be considered to cover implementation of the technology in connection with components beyond rotors, as well.

Initial Acts

Figure 5:
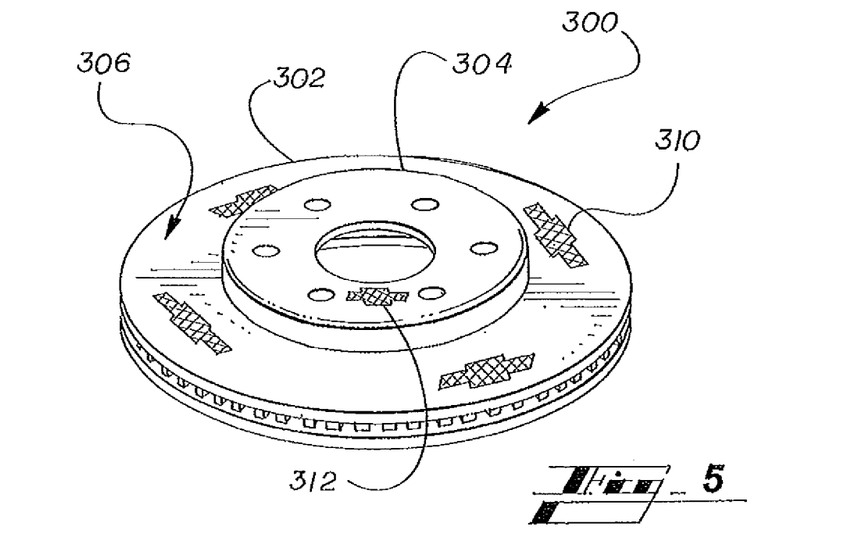
FIG. 5 illustrates a perspective view of the rotor of FIG. 3.

The method 400 begins 402 and flow proceeds to block 404, which includes providing or obtaining the component—in the present exemplary embodiment, the brake rotor 300 shown in FIGS. 3 and 5. As described, the rotor 300 includes a frictional portion 302 and a hat portion 304. As also provided, the rotor 300 can include any one or more of a variety of materials, without departing from the scope of the present disclosure. For instance, the frictional portion 302 can include steel, cast iron, or a combination thereof, and the hat portion 304 can include an alloy (e.g., Al—Fe or an Al 356 casting alloy).

The method 400 continues to an act 406 of applying a chemical treatment to the brake rotor 300. The application 406 is made selectively to cover an amount of the subject surface (e.g., frictional surface 306) to have a certain size and a certain shape with consideration to a desired size and desired shape of the desired designer feature. In FIGS. 3 and 5, the chemical applied is illustrated by reference numeral 310.

Masking Material

As provided, the chemical treatment mask 310 is configured to block or change an affect that a chemical alteration would otherwise have on the component, e.g., rotor 300, at the select positions of the component adjacent the mask. The change in affect can include, e.g., lowering or accentuating or increasing the affect. For example, the mask 310 can result in a different diffusion rate for relevant elements (e.g., nitrogen, carbon, and/or boron) at the component beneath the mask 310 as compared to at parts of the component not associated with the mask. The mask material 310 need not be a chemical.

The mask material 310 can be selected so that the different rate of diffusion is (a) zero or nil rate (i.e., the mask 310 completely blocks diffusion), (b) only slightly different (e.g., the mask 310 blocks only a relatively small percentage of diffusion), or (c) somewhere between the slight difference and complete blocking.

In the context of a ferritic nitrocarburizing (FNC) process for the rotor 300, the chemical 310 is used to prevent nitrogen and carbon from diffusing into the rotor 300, and the rotor includes a ferrous metal. Exemplary ferrous metals include steel, iron (e.g., cast iron), and alloys of iron and other metals (e.g., stainless steel).

In some embodiments, the treatment includes diffusing one or more elements along with or instead of nitrogen and carbon. For example, the treatment may include diffusing any one, two, or all three of nitrogen, carbon, and boron. A process infusing boron into a component can be referred to as boronizing. A process infusing nitrogen into a component can be referred to as nitriding. A process infusing carbon into a component can be referred to as carburizing. A process infusing nitrogen and carbon into a component can be referred to as nitrocarburizing.

In some embodiments, the chemical 310 includes a compound. Exemplary compounds are referred to as S 100, Contradur, Contradur Gako, Contradur OX, and Black 15 by the vending company, Durferrit® (Durferrit GmbH, Industriestrasse is based in Manheim, Germany).

Compounds or other materials created or obtained, such as commercially-available compounds or other materials, can be altered as desired to achieve desired properties before application to the subject component (e.g., rotor). For instance, a compound can be altered by thinning or other optimizing process to achieve desired properties.

Figure 6:
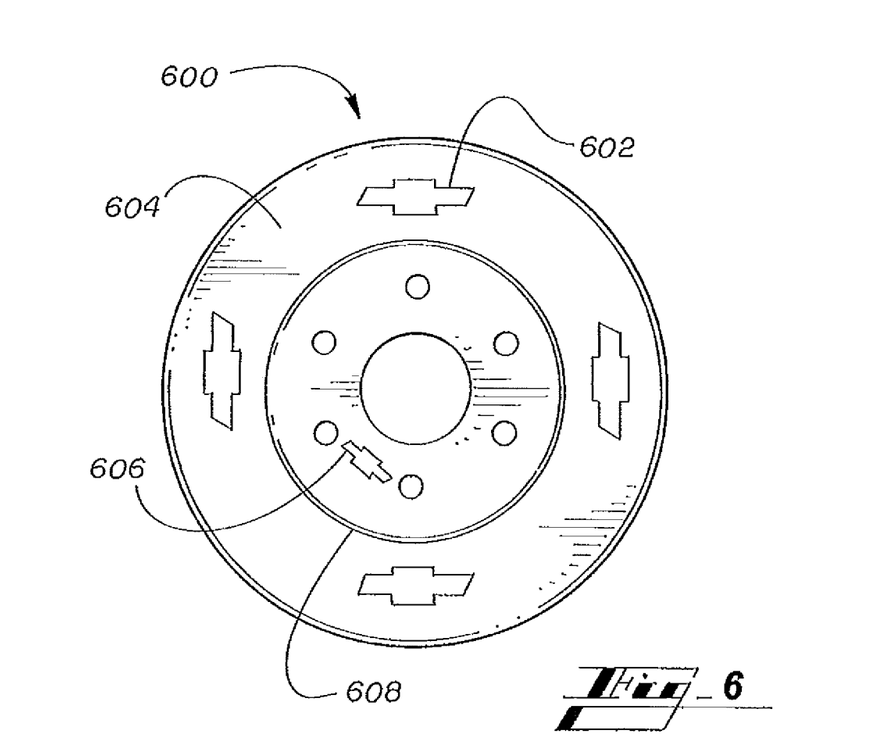
FIG. 6 illustrates a plan view of a completed rotor, processed according to the method illustrated in FIG. 4, using the chemical treatment mask shown in FIGS. 3 and 5.
Figure 7:
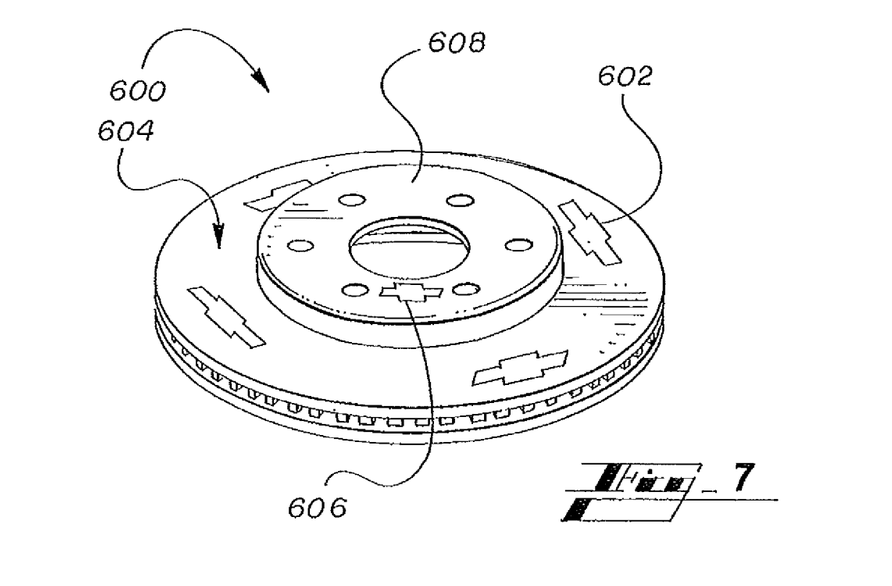
FIG. 7 illustrates a perspective view of the rotor of FIG. 6.

Desired properties for the chemical compound or material, relate to desired properties of the resulting rotor (shown by way of example in FIGS. 6 and 7). Example desired properties include a desired visual contrast between a resulting custom designer feature, sharpness of edges of the feature, color, shade, tint, and operational properties of the feature in conjunction with or in comparison to aspects of the rotor other than those of the designer feature.

Regarding operational characteristics, for instance, in some embodiments, the resulting rotor (FIGS. 6 and 7) has one or more improved operational characteristics, as compared to rotors lacking the custom designer feature. An example operational property is a frictional coefficient of the frictional surface of the rotor. The rotor at and/or adjacent the custom designer feature has a desired frictional coefficient. And the frictional surface as a whole, including the custom designer feature, would be made to have desired effective coefficients of friction, or a desired effective or overall coefficient of friction. Other example operational properties are weight, mass, strength, and NVH (noise, vibration, and harshness), wear, and friction.

In some embodiments, the mask 310 includes a compound having a solvent base. In particular embodiments, the compound including the solvent base is configured to protect against carburization. Further, the compound may protect against carburization under low pressure or a partial or full vacuum. Solvent-based masking compounds can be used in connection with thermochemical heat treatment carried out in a gas atmosphere. Some masking compounds are configured to be used in connection with carburizing in granulate.

Possible bases for the masking material, other than solvents, include so-called aqueous lacquer and silicate. Aqueous lacquer-based masking materials can be used in nitriding, carburizing, and nitrocarburizing. Regarding an ability to alter the masking chemical before application to the subject component (e.g., rotor), which is mentioned above, aqueous lacquer-based masking materials can be easily thinned down with water. Aqueous lacquer-based masking material is also easy to wash off, such as washing off of the rotor, after use as a mask, in an industrial washing machine. Another example characteristic for a compound for use as a mask is an ability to remain in place during intense processing, such as high-pressure gas quenching. The masking material can be selected and/or formed or manipulated to exhibit these characteristics and other desired characteristics.

Example silicate-based masking materials are referred to as Waga and Antidur by the same vending company identified above, Durferrit®. These materials can be used when carburizing, such as carburizing in gas, powder, or granulate.

Another type of masking element is a so-called kneadable masking compound. Example kneadable masking materials are referred to as Atomin and Rekord by the same vending company, Durferrit®. These materials can protect (i.e., act as a protectant) against diffusion into a component when carburizing the component, such as carburizing in powder or granulate.

Application of Chemical Treatment

Continuing with the method 400 of FIG. 4, the chemical treatment 310 can be applied 406 to the rotor 300 in any of a variety of ways without departing from the scope of the present technology. In one embodiment, the chemical 310 is applied 406 by brushing or painting (i.e., a brush-on or paint-on technique). In another embodiment, the chemical 310 is applied 406 by spraying (a spray-on technique).

Location, Size, and Shape of Chemical Treatment

As further shown in FIGS. 3 and 5, the chemical 310 can be applied in more than one distinct location for forming distinct designer features. In the example shown, four applications of the chemical 310 are made on the frictional surface 306 of the rotor 300.

By reference numeral 312, FIGS. 3 and 5 show the same or different chemical applied to the hat portion 304 of the rotor 300.

Contemplated shapes for the chemical application 310, 312 include company symbols, alphanumeric symbols, and images such as an image of a vehicle. While the chemical applications 310, 312 can be made in any desired shape without departing from the scope of the present technology, in the illustrated embodiment, each chemical application 310, 312 is made to form a symbol for the Chevrolet® automotive brand, oft referred to as the "bowtie" emblem.

Such multiple chemical applications 310, 312 can be the same, different, and/or arranged on the component in any of a variety of ways. For example, in some embodiments, the applications 310, 312 are identical and equally spaced about the component, such as shown for the applications 310 forming the four generally equally-spaced emblems on the frictional surface 306 in FIGS. 3 and 5. In other cases, multiple applications 310, 312 are positioned about the component to form a desired pattern. In other words, each of the chemical applications 310, 312 can be sized and shaped in the same way or uniquely as compared to sizes and shapes of any of the other applications 310, 312, and positioned as desired on the rotor 300. The applications 310, 312 can be sized and shaped to constitute any portion, or percentage, of the surface(s) on which they are applied.

Component Processing

With continued reference to FIG. 4, following application 406 of a chemical treatment 310, 312 to the brake rotor 300, the method 400 proceeds to an act 408 of processing the rotor. Processing 408 the rotor 300 includes exposing the rotor 300 to a stimulus, such as a chemical bath. It is this stimulus that the chemical treatment 310, 312 is configured to change the affect of. For example, regarding stimuli configured to cause one or more elements (e.g., nitrogen and/or carbon) to diffuse into the rotor 300, the chemical treatment 310, 312 is selected and applied to the rotor 300 to affect the diffusion of those elements into the rotor 300 at portions of the rotor covered by the chemical treatment 310, 312.

As indicated, when the stimulus includes diffusion of one or more elements, the chemical treatment 310, 312 can result in, for example, a different diffusion rate for relevant elements (e.g., N, C, and/or B) at the component beneath the chemical treatment 310, 312. And the masking treatment 310, 312 can be selected so that the different diffusion rate may be (a) a zero or nil rate (i.e., the chemical treatment 310, 312 completely blocks diffusion), (b) only a slight difference (e.g., the mask 310 blocks only a relatively small percentage of diffusion), or (c) anywhere between the slight difference and complete blocking.

Full effects of the stimulus extend to a depth into the rotor 300, at locations of the rotor exposed to the stimulus and lacking the chemical treatment 310, 312. The chemical treatment 310, 312 affects physical characteristics of the rotor to a depth beneath the surface of the rotor 300 by blocking, or affecting to some degree short of complete blocking, the stimulus in connection with portions of the rotor treated with the chemical treatment 310, 312. The depth that the stimulus affects the rotor, and so the depth to which the chemical treatment 310, 312 can affect the effect of the stimulus, is not limited. One or both of these depths can extend through a total thickness of the rotor—e.g., from a first surface on which the chemical treatment 310, 312 is made, through the part, to a second surface, opposite the first.

In some embodiments, one or both of these depths represents a percentage of the total thickness of the part. The percentage is in particular embodiments between about 1 percent (or less) and about 100 percent (i.e., the total thickness). In further particular embodiments, the percentage for one or both depths is between about 5 and about 25 percent.

As example depth measurements, in some embodiments the diffusion can occur to between about 10 and about 2000 micron, into the part beyond each surface treated. Many automobile rotors have a thickness of about 10-12 mm. Application of the stimulus, e.g., thermochemical treatment, FNC, etc., can be repeated (e.g., the stimulus or application altered in some way, and a repeat application performed) to achieve deeper diffusion. One such change would be to increase temperature and/or a total time of the second application.

Accordingly, differences in physical characteristics of the rotor, in the area affected by the chemical masking treatment, compared to an area that is not affected by the chemical masking treatment, can extend through an entirety of a thickness of the part in association with where the masking treatment is made. A custom designer feature can thus be visible, not only at a first surface on which the chemical treatment is made, but also at an opposite surface. It is contemplated that such second, opposing, designer feature, formed on an opposite surface, can have generally the same shape as the first designer feature formed on a first surface (i.e., a surface shown in FIGS. 3 and 5) on which the chemical treatment is made. In one contemplated embodiment, the second designer feature is larger than the first. In one contemplated embodiment, the second designer feature is smaller than the first.

In one embodiment, whether the second designer feature is smaller than, the same size as, or larger than the first designer feature, the second designer feature has generally the same shape as the first and at least one characteristic different than the first. For example, lines forming the second feature are in some cases less-sharp than lines forming the first feature. For instance, lines or edges of the second feature could be more rounded than corresponding first-feature lines or edges. Or lines or edges of the second feature could be more blurry. As another example, a coloring of the second feature is in some cases different than a coloring of the first feature.

In one embodiment, processing 406 the rotor 300 includes exposing the rotor to a ferritic nitrocarburizing (FNC) process. The FNC process is described generally, above. As provided, the FNC process involves diffusing nitrogen and carbon into the rotor 300. FNC processing is typically performed on a ferrous metal being at a sub-critical temperature for the metal. Exemplary temperatures include from about 525° C. (977° F.) to about 625° C. (1157° F.). Particularly, for FNC, the component material (e.g., steel or other ferrous alloy) should be at a temperature, in this range, at which the component material is in its ferritic phase, instead of a temperature causing the material to be in an austenitic phase.

There are four main types, or classes, of FNC processing: gaseous, salt bath, ion or plasma, and fluidized-bed. Use of FNC processing, and more particularly salt bath FNC processing, on brake rotors is described in U.S. Pat. Publ. No. 2008/0000550, the entirety of which is incorporated herein by reference. In one embodiment, component processing, e.g., FNC processing, is performed on the friction portion 306 of the rotor 300, being masked selectively as described, prior to connecting the friction portion 304 to the hat portion 304 thereto.

Resulting Component

At block 408, the resulting rotor is removed from the stimulus (e.g., FNC bath). In addition to removal from the stimulus, this act can include any additional finishing for the rotor, such as washing the rotor in an industrial washing machine. Finishing can also include quenching the rotor, such as by a high-pressure gas quenching.

In one embodiment, after removing the brake rotor from a nitrocarburizing salt bath, the brake rotor is immersed directly into an oxidizing salt bath, which is at a lower temperature than the nitrocarburizing salt bath, thereby thermally quenching the brake rotor. In some embodiments, finishing includes machining, e.g., machining the frictional surface of the rotor.

At block 410, the process may end. FIG. 6 shows the resulting rotor 600. The process 400 may be repeated to produce another rotor 600.

The resulting rotor 600 shown in the embodiment of FIG. 6 includes four custom designer features 602 formed in the frictional surface 604 of the rotor 600 and a custom designer feature 606 formed in the surface of the hat portion 608 of the rotor 600. The four designer features 602 in the frictional surface 604 are formed in response to the surface having a different chemical composition or characteristic at those portions, over which the chemical masking treatment 310 was provided prior to the processing at block 406, as compared to adjacent portions of the frictional surface 604, over which the chemical masking treatment 310 was not provided prior to the processing 406.

Each designer feature has a size and shape corresponding to the size and shape of the chemical treatment used to form it. In some embodiments, a designer feature is sized and shaped generally identically to the size and shape of the chemical treatment applications used to form it. In a contemplated embodiment, the designer feature is sized and/or shaped differently in some way than the size and shape of the chemical treatment applications used to form it. For instance, the resulting designer feature could be larger or smaller, and/or have a different shape.

FIG. 7 shows a perspective view of the resulting rotor 600, including the custom designer features 602, 606 on the frictional surface 604 and surface of the hat portion 608, respectively. In some embodiments, the custom designer features 602, 606 will be visible throughout an appreciable life of the rotor 600. When FNC or a like process, for example, is performed in the method 400, the custom designer features 602, 606 can be visible throughout the appreciable life of the rotor 600 because resurfacing would not be needed.

Mechanical Masking

Figure 8:
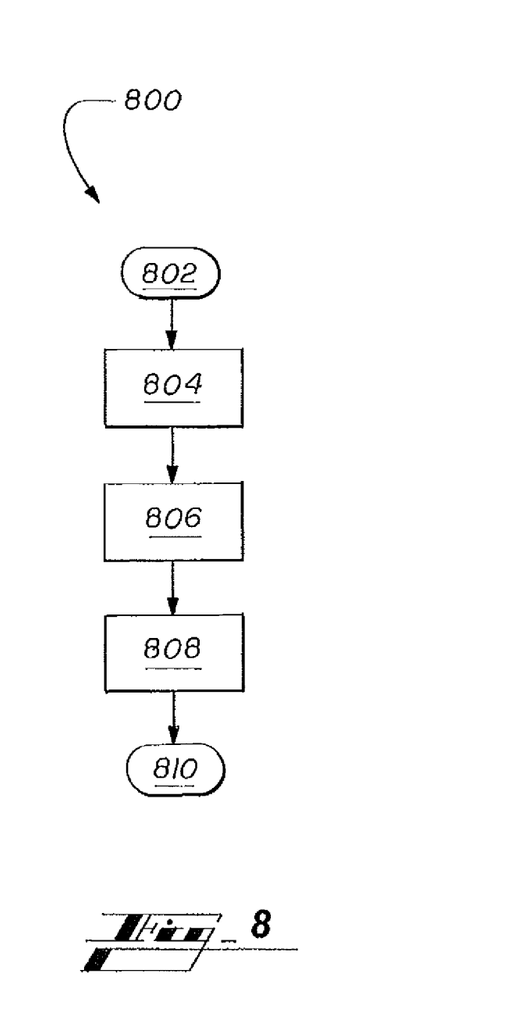
FIG. 8 illustrates a method for forming a completed rotor, shown in FIGS. 11 and 12, using a mechanical mask.

As provided, masking the subject component—e.g., automotive brake rotor, can be accomplished mechanically. FIG. 8 shows schematically acts of a method 800 for forming a custom designer feature on a component, using a mechanical mask, according to the present technology. It should be understood that the acts of the method 800 are not necessarily presented in any particular order and that performance of some or all the acts in an alternative order is possible and is contemplated. The acts have been presented in the demonstrated order for ease of description and illustration. Acts can be added, omitted and/or performed simultaneously without departing from the scope of the appended claims. It should also be understood that the illustrated method 800 can be ended at any time.

Figure 10:
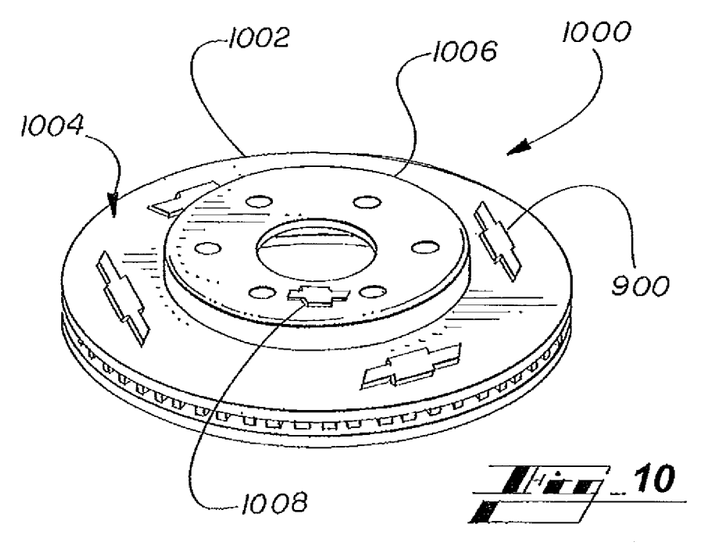
FIG. 10 illustrates a perspective view of a rotor with the mechanical mask positioned thereon.

The method 800 of FIG. 8 is presented in conjunction with the rotor 1000 shown in FIG. 10. Generally, acts 802-810 of the method 800 correspond to acts 402-410 of the method described above in connection with FIG. 4. A primary distinction between the method 800 of FIG. 8 and the method 400 of FIG. 4 is that the method 800 of FIG. 8 includes an act 806 of providing a mechanical treatment or mask, as compared with the act 406 of the method 400 of FIG. 4 wherein a chemical treatment is provided.

Figure 9:
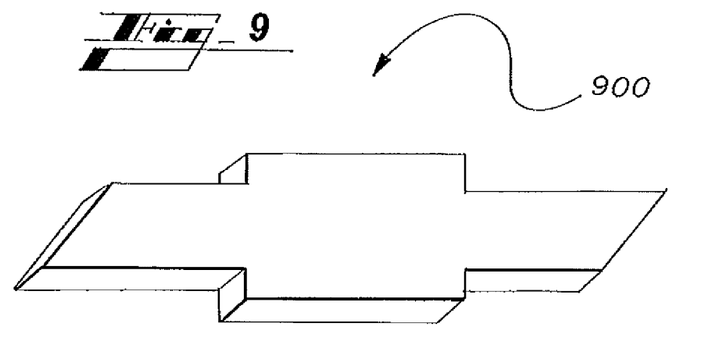
FIG. 9 illustrates a perspective view of the mechanical mask.

FIG. 9 shows perspective view of an exemplary mechanical mask 900. In this exemplary embodiment, the mechanical mask 900 is shaped to form a custom designer feature like the custom designer features 602, 606 shown in FIGS. 6 and 7.

FIG. 10 shows a perspective view of a rotor 1000. Like prior rotors, the rotor 1000 in this embodiment includes a frictional portion 1002, having a frictional surface 1004, and a hat portion 1006. Mechanical masks 900 are provided on the rotor 1000 at four positions of the frictional surface 1004. At least one mechanical mask 1008 is provided on the hat portion 1006.

The mechanical mask 1008 provided on the hat portion 1006 can be the same as the mask 900 of FIG. 9 or different. The mechanical mask 1008 provided on the hat potion 1006 could also be similar in one or more ways and/or different in one or more ways as compared to the mask 900 provided on the frictional surface 1004, such as by having the same shape but being smaller or having the same shape but being larger.

At block 808, the rotor 1000 is removed from the stimulus and any additional acts, e.g., finishing, are performed as desired, such as described above in connection with the act of block 410 of the method 400 of FIG. 4.

At block 810, the process may end, and may be repeated to produce another rotor 1100. The method 800 may otherwise be identical to the method 400 of FIG. 4.

Figure 11:
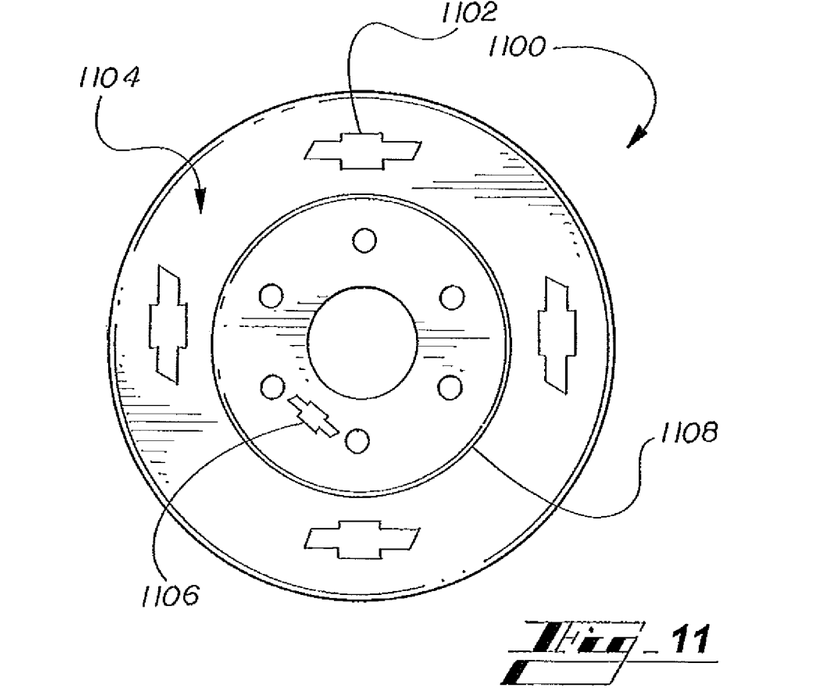
FIG. 11 illustrates a plan view of a completed rotor, processed according to the method of FIG. 8, using the mechanical mask.

FIG. 11 shows a rotor 1100 resulting from the method 800 of FIG. 8. The rotor 1100 resulting from this method 800 is in some embodiments generally the same as the rotor 600 resulting from the method 400 of FIG. 4. Although FIG. 11 shows the resulting rotor 1100 looking generally identical to the resulting rotor 600 of FIG. 6, it will be appreciated that the rotor 1100 resulting from the method 800 of FIG. 8 can be different than the rotor 600 resulting from the method 400 of FIG. 4.

Distinctions between the resulting rotors 600, 1100 can result from differing qualities and performance of the chemical and mechanical masks 310, 900. For instance, depending on materials of the respective masks, one of them could allow a greater rate of diffusion during chemical processing (e.g., FNC processing). As another potential distinction, in some embodiments, the treatment 310 and rotor are configured so that the rotor absorbs the chemical treatment 310, so that chemical treatment 310 is not only at the surface, but beneath the surface to a depth of the absorption. The chemical treatment 310 being within the rotor material in these embodiments affects the effect of the chemical processing (e.g., diffusion of nitrogen and carbon) on the rotor, thereby resulting in a different resulting custom designer feature.

As shown in FIG. 11, the rotor 1100 resulting from the method 800 of FIG. 8 includes four custom designer features 1102 formed in the frictional surface 1104 of the rotor 1100. The rotor 1100 also includes a custom designer feature 1106 formed in the surface of the hat portion 1108 of the rotor 1100. The four designer features 1102 in the frictional surface 1104 are formed due to the surface having different chemical composition or characteristic at those portions, over which the mechanical masking 900 was provided, prior to the processing 806 (e.g., FNC processing), as compared to adjacent portions of the frictional surface 1104, over which the mechanical masking 900 was not provided.

Figure 12:
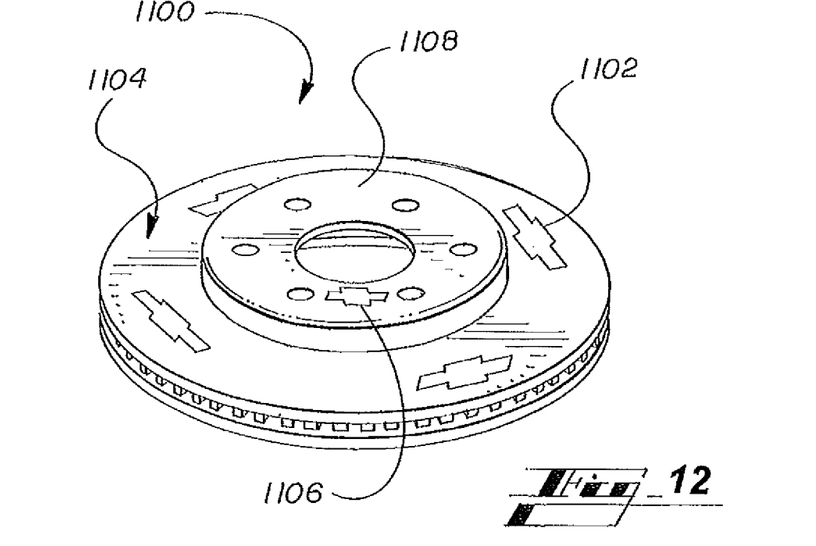
FIG. 12 illustrates a perspective view of the rotor of FIG. 11.

FIG. 12 shows a perspective view of the resulting rotor 1100, including the custom designer features 1102, 1106 on the frictional surface 1104 and surface of the hat portion 1108, respectively.

Additional Methods

As provided, some of the methods of the present technology for forming the resulting rotors do not use ferritic nitrocarburizing (FNC) processing, and some also do not include nitriding and carburizing. As one example, the rotor can be exposed to an oxidation stimulation. In this embodiment, the chemical or mechanical masking would affect (e.g., block, reduce, or increase) oxidization of the rotor beneath the chemical or mechanical masking. The different effect(s) results in the rotor having different material characteristics in the areas at and/or beneath the masked portion as compared to the areas not affected by the mask. The differences result in the distinct visual characteristics forming the custom designer features.

Other exemplary stimuli or treatments include laser treatment. In this embodiment, the rotor is exposed to one or more laser sources and the chemical or mechanical masking affects (e.g., blocks, reduces, or increases) effects of the laser on the rotor beneath the chemical or mechanical masking. Again, the different effect(s) results in the rotor having different material characteristics in the areas at and/or beneath the masked portion as compared to areas not affected by the mask, and the differences results in distinct visual characteristics forming the custom designer features.

CONCLUSION

Various embodiments of the present disclosure are disclosed herein. The disclosed embodiments are merely examples that may be embodied in various and alternative forms, and combinations thereof.

The technologies described can provide numerous performance and cost benefits associated with the manufacturing and use of components such as automotive brake rotors. Additional potential benefits include reducing mass, reducing weight, improving NVH (noise, vibration, and harshness), acoustic reflection, and energy absorption properties.

As indicated herein above, while a rotor is described for teaching purposes, it will be appreciated that the technology of the present disclosure can be used to improve the design and performance of a wide variety of products. In this way, references to rotors, and the parts thereof, encompass other components and parts thereof, such as other types of rotors and other automobile components, as well as non-rotor and non-automobile components. The analogous nature of the disclosure also applies in cases in which parts do not correspond with parts of the exemplary rotor.

The law does not require and it is economically prohibitive to illustrate and teach every possible embodiment of the present claims. Hence, the above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed is:

1. A method, for forming a brake rotor including a desired custom marking having a predetermined size and a predetermined shape, comprising:

applying a chemical treatment to a marking portion of a surface of the brake rotor, wherein:

the marking portion to which the chemical treatment is applied has a size and a shape corresponding to the predetermined size and the predetermined shape of the desired custom marking; and the chemical treatment is configured to affect, in a predetermined manner, an ability of a stimulus, to which the brake rotor is to be exposed, to alter properties of the brake rotor; and exposing the brake rotor, having the chemical treatment applied thereto, to the stimulus configured to alter properties of the brake rotor, wherein:

the stimulus alters properties of the brake rotor at the marking portion differently than the stimulus alters properties of the brake rotor at other portions of the brake rotor adjacent the marking portion, thereby forming physical differences in the brake rotor; and the physical differences in the brake rotor, being visually perceptible, form the custom marking.

2. The method of claim 1, wherein exposing the brake rotor to the stimulus includes performing at least one process comprising:

a nitriding process;
a carburizing process;
a boronizing process; or
an oxidation process.

3. The method of claim 1, wherein the brake rotor having the custom marking has an improved physical quality as compared to brake rotors that do not have the custom marking.

4. The method of claim 3, wherein the improved physical quality relates to a coefficient of friction quality.

5. The method of claim 3, wherein the improved physical quality relates to mass of the rotor.

6. The method of claim 1, wherein:

the marking portion is a first marking portion;
the predetermined size and the predetermined shape are a first predetermined size and a first predetermined shape, respectively;
the custom marking is a first custom marking;
the physical differences are first physical differences;
the method is also for forming the brake rotor including a second desired custom marking having a second predetermined size and a second predetermined shape; and
the method further comprises:

applying the chemical treatment to a second marking portion of the surface of the brake rotor, wherein the second marking portion to which the chemical treatment is applied has a size and a shape corresponding to the second predetermined size and the second predetermined shape of the second desired custom marking; and exposing the brake rotor, having the chemical treatment applied thereto, to the stimulus, wherein:

the stimulus alters properties of the brake rotor at the second marking portion differently than the stimulus alters properties of the brake rotor at other portions of the brake rotor adjacent the second marking portion, thereby forming second physical differences in the brake rotor; and the second physical differences in the brake rotor, being visually perceptible, form the second custom marking.

7. The method of claim 6, wherein the second predetermined size and the second predetermined shape of the second desired custom marking are the same as the first predetermined size and the first predetermined shape, respectively, of the first desired custom marking.

8. The method of claim 6, wherein at least one of the second predetermined size and the second predetermined shape of the second desired custom marking are different than the first predetermined size and the first predetermined shape, respectively, of the first desired custom marking.

9. The method of claim 6, wherein:

the first marking portion is on a frictional surface of the brake rotor to be contacted by a rotor pad in operation of the rotor; and the second marking portion is on a hat surface, of a hat portion, of the brake rotor.

10. The method of claim 1, wherein the marking portion is on a frictional surface of the brake rotor to be contacted by a rotor pad in operation of the rotor.

11. The method of claim 1, wherein applying the chemical treatment to the marking portion of the surface of the brake rotor includes applying the treatment by brushing the chemical treatment onto the marking portion.

12. The method of claim 1, wherein applying the chemical treatment to the marking portion of the surface of the brake rotor includes applying the treatment by spraying the chemical treatment onto the marking portion.

13. A method, for forming a brake rotor including a desired custom marking having a predetermined size and a predetermined shape, comprising:

applying a chemical treatment to a marking portion of a surface of the brake rotor, wherein:

the marking portion to which the chemical treatment is applied has a size and a shape corresponding to the predetermined size and the predetermined shape of the desired custom marking; and the chemical treatment is configured to affect, in a predetermined manner, an ability of a stimulus, to which the brake rotor is to be exposed, to alter properties of the brake rotor; and exposing the brake rotor, having the chemical treatment applied thereto, to the stimulus configured to alter properties of the brake rotor, wherein:

the stimulus alters properties of the brake rotor at the marking portion differently than the stimulus alters properties of the brake rotor at other portions of the brake rotor adjacent the marking portion, thereby forming physical differences in the brake rotor; and the physical differences in the brake rotor, being visually perceptible, form the custom marking, wherein exposing the brake rotor to the stimulus includes exposing the brake rotor to ferritic nitrocarburizing.

14. The method of claim 13, wherein the ferritic nitrocarburizing comprises at least one of:

gaseous exposure;

salt bath exposure;

plasma exposure; or fluidized-bed exposure.

15. A method, for forming a brake rotor including a desired custom marking having a predetermined size and a predetermined shape, comprising:

applying a chemical treatment to a marking portion of a surface of the brake rotor, wherein:

the marking portion to which the chemical treatment is applied has a size and a shape corresponding to the predetermined size and the predetermined shape of the desired custom marking; and the chemical treatment is configured to affect, in a predetermined manner, an ability of a stimulus, to which the brake rotor is to be exposed, to alter properties of the brake rotor; and exposing the brake rotor, having the chemical treatment applied thereto, to the stimulus configured to alter properties of the brake rotor, wherein:

the stimulus alters properties of the brake rotor at the marking portion differently than the stimulus alters properties of the brake rotor at other portions of the brake rotor adjacent the marking portion, thereby forming physical differences in the brake rotor; and the physical differences in the brake rotor, being visually perceptible, form the custom marking, wherein the marking portion is on a hat surface, of a hat portion, of the brake rotor.

* * * * *